May 10, 1960 J. MURPHY 2,936,439

PRINTED CIRCUIT CONNECTOR

Filed Aug. 26, 1957 3 Sheets-Sheet 1

INVENTOR.
JAMES MURPHY

BY Max Schwartz
ATTORNEY

INVENTOR.
JAMES MURPHY
BY Max Schwartz
ATTORNEY

INVENTOR.
JAMES MURPHY
BY Max Schwartz
ATTORNEY

United States Patent Office 2,936,439
Patented May 10, 1960

2,936,439

PRINTED CIRCUIT CONNECTOR

James Murphy, Providence, R.I.

Application August 26, 1957, Serial No. 680,254
10 Claims. (Cl. 339—176)

My present invention relates to electrical connectors, and more particularly to a novel construction of a multiple circuit connector for printed circuits.

The principal object of the present invention is to provide a multiple circuit connector for a printed circuit which has a low insertion force.

A further object of the present invention is to provide a multiple circuit connector having a low ohmic resistance.

Another object of this present invention is to provide a multiple circuit connector having good conductivity.

A further object of the present invention is to provide a multiple circuit connector suitable for either single or double printed circuits.

Another object of the present invention is to provide a multiple circuit connector which is simple in construction and which can be readily molded in automatic molds and is easy and economical to assemble.

With the above and other objects and advantages features in view, my invention consists of a novel arrangement of parts, more fully described in the detailed description following, in conjunction with the accompanying drawings, an dmore particularly defined in the appended claims.

Figure 1:
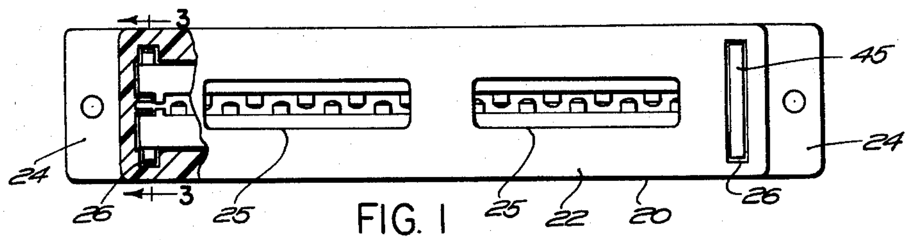
Fig. 1 is a top plan view, partly broken away of a connector embodying my invention.

Many types of electronic equipment now use printed circuits. These require elongated connectors designed to slide over the edge of the circuit board and contact each element of the circuit on one or both sides of the board. Also, the conventional male and female insertion type connectors have been expanded so that a single connector may have 25 or more connections. These constructions have resulted in problems characteristic of electronic circuits. It is essential that the connector have good conductivity, maintain proper spring tension and have a low ohmic resistance. In view of the multiplicity of contacts the connector may have an extremely high insertion force with the resulting strain on the insulating body. A low insertion force is also necessary to facilitate assembly operations. In the case of the printed circuit, the boards on which they are printed will vary plus or minus .015 over a mean dimension such as 1/16″, 3/32″, etc. This means that there may be total variation of .030″ from one board to the next. If the connector is built to provide the best balance between the insertion force and the ohmic resistance its performance will vary from board to board.

The present invention is designed to provide a multiple connector which will obtain the best results regardless of the varying conditions. This is accomplished by providing the connector with a cam action which permits a low initial insertion force and results in a uniform contact pressure. The connector of the present invention is also easily manufactured from three separable parts which can be easily assembled.

Referring more in detail to the drawings illustrating my invention, Figs. 1 to 9 inclusive show one form of the invention applied to a multiple connector for a printed circuit board. The connector comprises a base 20 in the form of an elongated rectangular body of dielectric material which can be readily molded of plastic or any other suitable material. The base 20 is in the form of an elongated rectangular housing and comprises sides 21, an integral top 22 and an open bottom. The integral end walls 23 terminate adjacent the bottom edge in integral outwardly extending tab portions 24 for mounting the connector.

Figure 2:
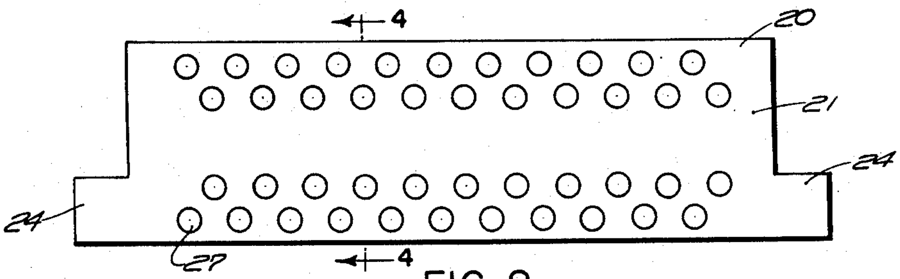
Fig. 2 is a side elevation of the same.
Figures 7, 8, 9:
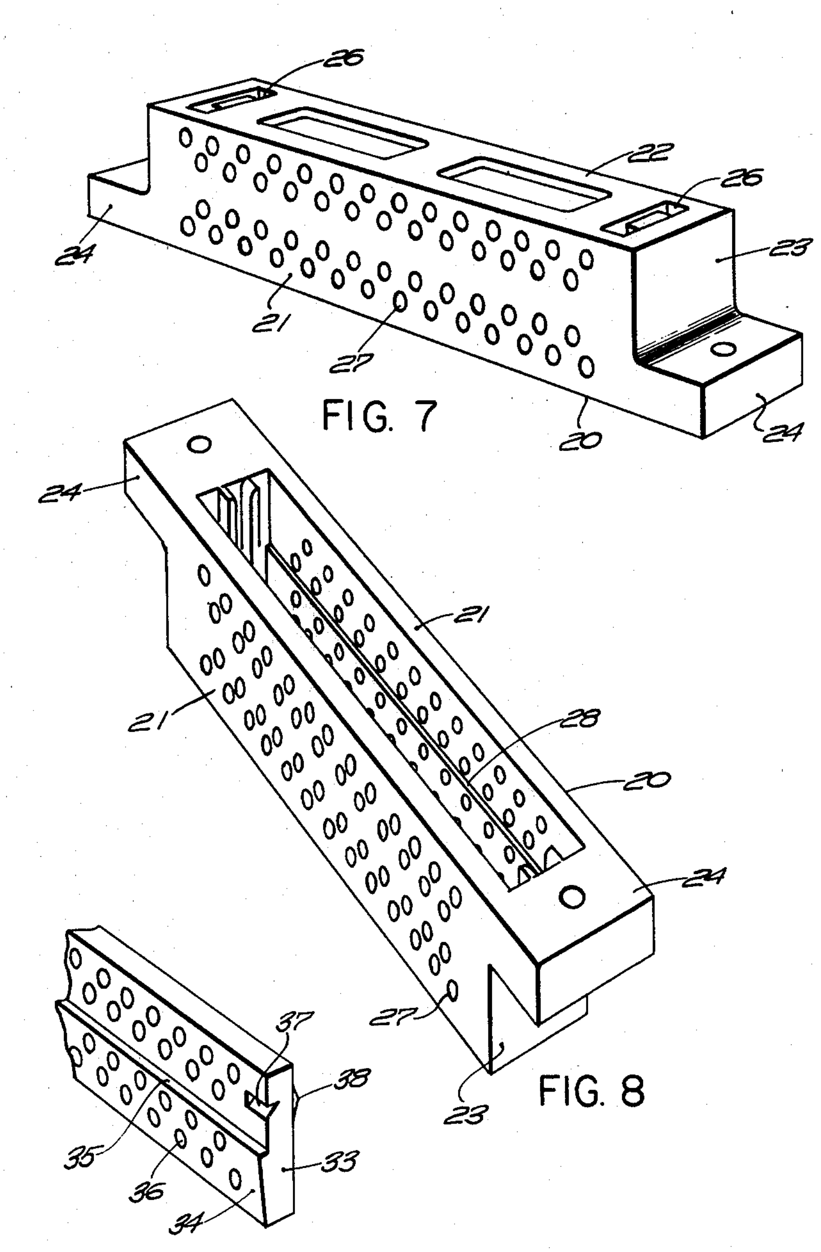
Fig. 7 is a perspective view of the cover.
Fig. 8 is a perspective view of the cover taken from the bottom to show the interior.
Fig. 9 is a fragmentary perspective view of one of the plastic boards.
Figure 10:
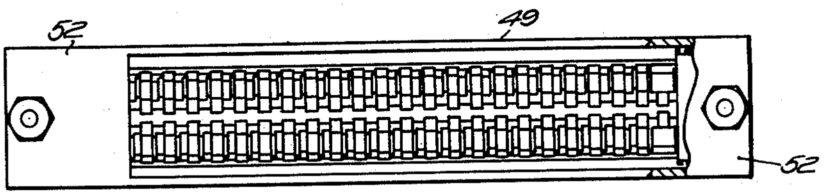
Fig. 10 is a top plan view of another form of connector embodying my invention.

The top 22 as shown in Figs. 1 and 7 is provided with spaced rectangular openings 25 which reduces the weight and permits circulation of air for cleaning. Adjacent each end of the top 22 is a transverse slot 26. Each of the sides 21 is provided with a plurality of openings 27 extending therethrough. The openings 27 coincide with the position on the contact pins and it will be noted that they are disposed in two horizontal sections of two rows each, the holes being in staggered relation as shown in Fig. 2.

Figures 3, 4, 5, 6:
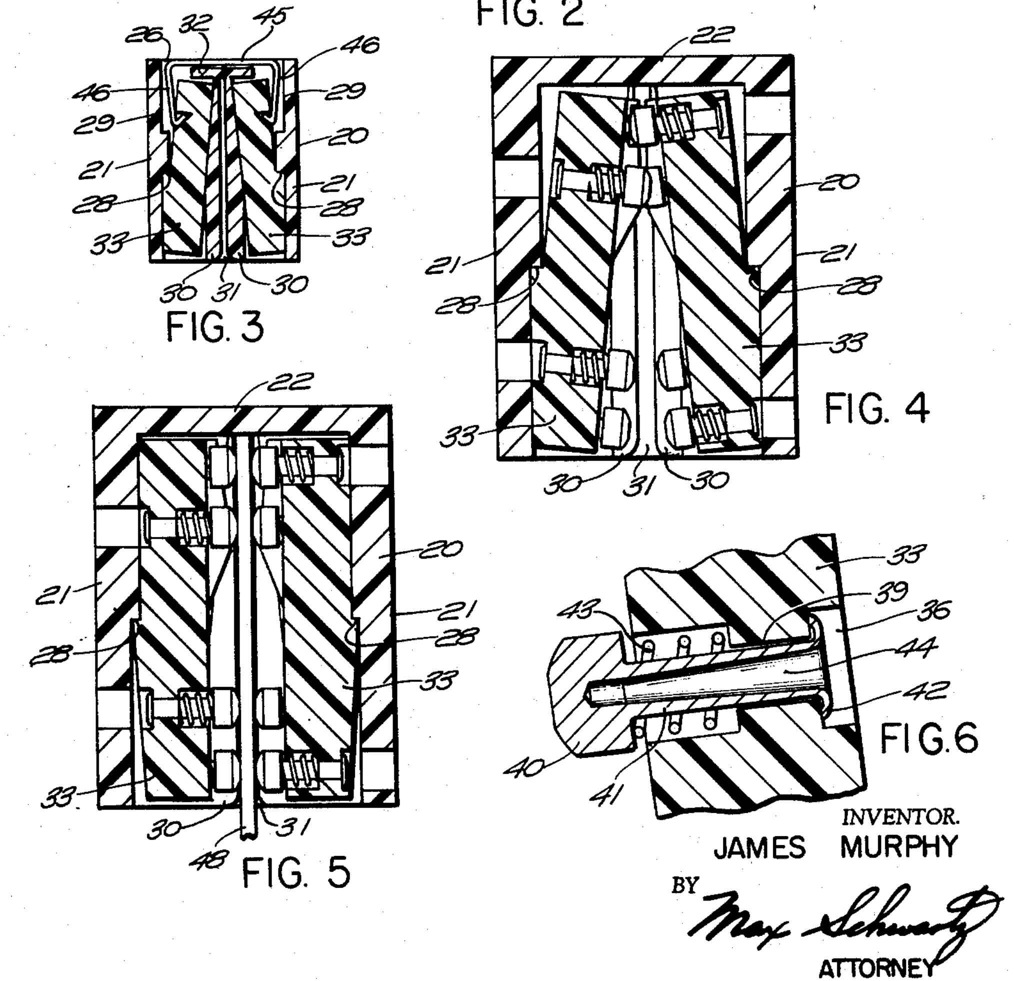
Fig. 3 is a section taken on line 3—3 on Fig. 1.
Fig. 4 is an enlarged section taken on line 4—4 on Fig. 2.
Fig. 5 is a section similar to Fig. 4 with the multiple board inserted.
Fig. 6 is an enlarged section of one of the contact pins.

The interior of the base or housing 20 is formed as shown in Figs. 1, 3 and 8. The side walls 21 are thinner at their lower end than at the upper end so that an abrupt shoulder 28 is formed horizontally along the inside walls approximately midway of each wall. Referring to Fig. 3 it will be noted that the inside of each side wall 21 is additionally cut away at 29 beneath the slots 26 at each end of the base. The interior of the end walls 23 are provided with spaced parallel integral portions 30 extending vertically in the center of each end wall and defining a slot 31 between them. The outside walls of the portions 30 are tapered inwardly at their upper ends as shown in Fig. 3 and terminate in a horizontal portion 32 disposed in the slot 26 but slightly beneath the top surface of the housing.

I now provide a pair of plastic boards 33 of elongated rectangular shape adapted to fit into the base 20 as shown in Figs. 3, 4 and 5. Each board is provided at its outer surface with a portion 34 which tapers outwardly and upwardly to a point midway of the board terminating in a shoulder 35 extending horizontally across the board. Each board 33 is provided with a plurality of openings 36 spaced identically with the sets of openings 27 in the base 20 so that when the boards are inserted in the base the openings 27 and 36 will be in alignment. Adjacent the upper outer edge at each end each board is provided with an undercut notch 37 and on the opposite side, on the inner wall each board is provided with a triangular raised portion 38.

Referring to Fig. 6, each opening 36 is provided with a narrow restricted portion 39. A contact pin or terminal is mounted in each opening 36. It comprises a contact head portion 40 having an intergal shank 41 which extends through the opening 36, through the restricted portion 39 and terminates in an end 42 which is swaged over to prevent withdrawal. A coil spring 43 surrounds the shank 41 beneath the head 40 and bears its inner end against the restricted portion 39. With this arrangement the head 40 is held outwardly from the surface of the board 33 by the coil spring 43. Limited inward movement is permitted against the action of the spring between the head and the surface of the board. The shank portion 41 is provided with an inwardly tapering opening 44 for inserting a friction contact pin.

In assembly the boards 33 are inserted into the base 20 with the heads 40 of the contact pins facing inwardly towards each other as shown in Fig. 4. The boards are inserted so that tapered portions 34 bear against the inner lower thinner walls and they are pushed inwardly until the shoulders 35 engage the wall shoulders 28. It will be noted that in this position the boards 33 are inclined towards each other in an inverted V shape as shown in Figs. 3 and 4. An inverted U shape assembly spring 45 is now inserted in each slot 26 as shown in Figs. 1 and 3. The horizontal portion of the spring 45 rests on the horizontal portion 32 at the end walls 23. The depending arms 46 of the spring 45 are bent at an acute angle inwardly each terminating in a hooked portion 37 which snaps into the notches 37 on the boards at each end to hold the boards in the base in the position shown in Figs. 3 and 4. It will be noted that the thinner walls or surfaces of the boards 33 will rest at each end on the tapered wall portions of the members 30. It will also be noted that at their lower end the terminals are a sufficient distance apart to clear the slots 31. The connector is now ready for use.

Referring to Fig. 5, a printed circuit board 48 is inserted into the connector so that it rides in the slot 31. It will be noted that there is no contact on the board 48 and that it will slide freely into the connector with little effort. As it approaches the inner end, the board 48 will first contact the triangular portions 38 on the inserts 33 and begin to force them apart. Further movement will force the printed circuit board 48 between the contact pins at the upper ends of the boards 33 into the position shown in Fig. 5. As this action takes place the boards 33 will pivot at the shoulders 28 and 35 against the action of the springs 45 until the upper portions of the boards 33 are flat against the inner upper walls of the base and in exact spaced parallel relation. This camming action brings the lower ends of the boards towards each other until the contact heads 40 contact the printed circuit board 48. In the final position as shown in Fig. 5, the contact pins 40 will be contacting the printed circuit board under the action of the coil springs 43. Thus the initial insertion of the printed circuit board 48 is free of friction until it is almost wholly within the connector. The end of the thrust encounters some resistance but it is less a dragging action and more a spreading action to produce the cam motion on the boards 33. By spacing the contact pins to provide a proper electrical contact with the thinnest board the yielding movement of the heads 40 against the action of the springs 43 will allow for the easy insertion of the thickest board. Thus the proper electrical contact will not vary with the thickness of the printed circuit board 48. For special items or sizes of boards any of the contact pins can be eliminated according to the needs of the customer. Thus a single basic model can provide various connector patterns.

It should be noted that the printed circuit board 48 is confined within the slots 31 at each end of the connector. There is thus no lateral movement and the contact pressure is equal on both sides. This permits the connector to be used on a board printed on one side only. Under such circumstances the contact pins on one side can be eliminated or even the entire board 33 left out leaving only a single board to contact one side of the printed circuit. The connector can easily be molded on automatic machines and the assembly is simple.

This same camming action is carried out in the form shown in Figs. 10 to 15 inclusive. In this form only a single row of contacts can be mounted on each side of the board and the constructions are simpler and easier to manufacture and assemble.

Figure 11:
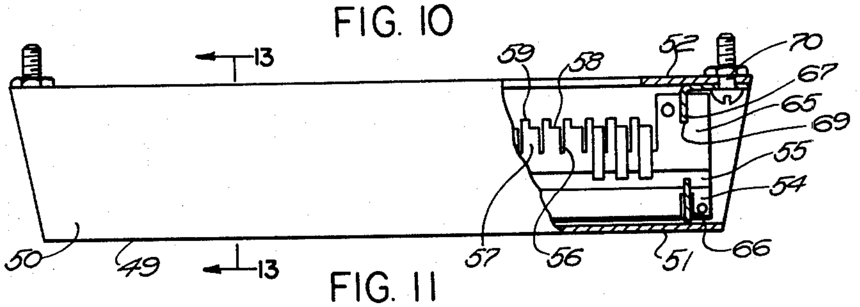
Fig. 11 is a side elevation of the form shown in Fig. 10.

Referring to Figs. 10 to 15 inclusive, the base or housing 49 is in the form of a rectangular tubing having sides 50, an integral bottom 51, and an open top which is closed adjacent each end at 52. The ends are open and tapered outwardly and upwardly as shown in Fig. 11. The bottom 51 is provided with a central longitudinal slot 53 of sufficient width to permit the insertion of a printed circuit board. The contact elements are mounted on a pair of dielectric rectangular boards 54 each having a rectangular groove 55 extending longitudinally on its outer surface between the top and bottom edges. The top edge of each board 54 is provided with a plurality of spaced vertical slots 56 defining a contact mounting portion 57 between each slot. The top edge of each portion 57 is cut down to form a lower edge 58 and a higher portion 59. The contact members are mounted on the portions 58 and the portions 59 act as separators.

Figure 13:
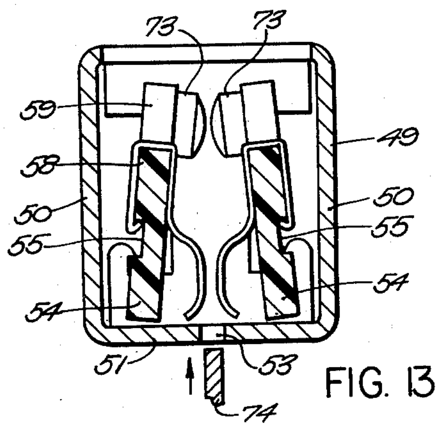
Fig. 13 is an enlarged section taken on line 13—13 on Fig. 11.
Figure 14:
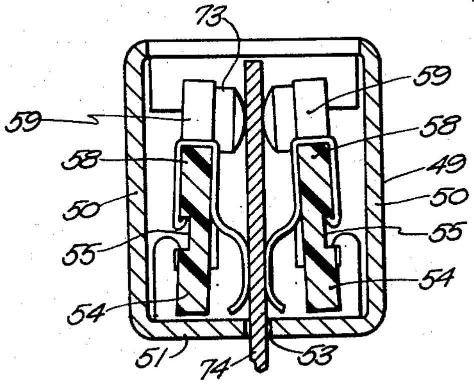
Fig. 14 is a section similar to Fig. 13 with the printed circuit board inserted.
Figure 15:
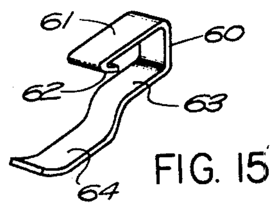
Fig. 15 is a perspective view of one of the contact pins in the form shown in Fig. 10.

The contact elements are shown in Fig. 15. Each element comprises a generally inverted U-shaped portion having a short flat horizontal top 60, one short arm 61 which terminates in a hooked end 62 and a long arm 63 which terminates in a flat spring shoe contact portion 64. As can be seen in Figs. 13 and 14, each contact member is snapped over a portion 58 on the boards 54 until the hooked end 62 snaps into the groove 55 to lock the contact in place. The contact portions 64 extending inwardly above the slot 53.

Figure 12:
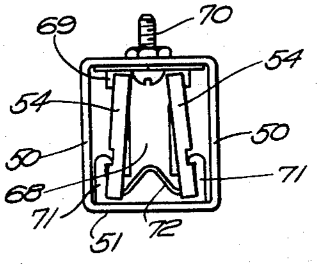
Fig. 12 is an end view of the form shown in Fig. 10.

The boards 54 are mounted in the base 49 as shown in Figs. 11 and 12. At each end, each board 54 is provided with a portion 65 which extends upwardly beyond the intermediate top edge of the board. Adjacent the end the bottom of each board is provided with a vertical slot 66 and transversely opposite the slot 66 is a slot 67 in the upper edge of the portion 65. The boards 54 are held in the base 49 by a pair of I-shaped members 68, one at each end. Each board 54 is mounted on each side of the vertical portion of the member 68. The upper horizontal leg 69 extends into the slots 67 of the boards as shown in Fig. 11. The upper end of the portion 69 is then bent at right angles and bolted at 70 to the portion 52 of the housing. The lower horizontal arm of the member 68 is provided at each outer end with a vertical portion 71 terminating in a hook which snaps into the groove 55 along the side of each board. At the extreme ends an inverted V-shaped spring 72, see Fig. 12, straddles the board 54, the ends of the springs entering small openings in the boards. This spring resiliently spreads the bottom portion of the boards apart so that they pivot on the portions 71 with the upper ends of the boards slanted inwardly as shown in Figs. 12 and 13. Adjacent each upper end each board is provided with a cam button 73.

With the parts assembled as above described the boards 54 and the contact elements will be in the position shown in Fig. 13. Now when a printed circuit board 74 is inserted through the slot 53 it will easily pass between the contact portions 64 barely touching them. This provides an easy insertion force. The printed circuit board 74 will move inwardly until it reaches the cam buttons 73 as shown in Fig. 14. Further movement of the board 74 will spread the upper ends of the boards 54 and cause a pivoted camming action which will bring the bottom ends inwardly against the action of the spring 72. This will force the resilient contact portion 64 against the surface of the printed circuit board 74 to make a firm electrical contact.

In both forms I have provided a multiple connector adaptable for making large numbers of contacts either on a printed circuit or in a male and female type of connector wherein the connector has a low insertion force but is provided with a camming action which makes the contacts on the proper spring tension to provide good conductivity and low ohmic resistance. The camming action provides sufficient movement to compensate for any variations in the thickness of the printed circuit board. The constructions illustrated are simple and easy and economical to manufacture and assemble. Other advantages of the present invention will be readily apparent to a person skilled in the art.

I claim:

1. A multiple connector comprising an elongated rectangular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, means for resiliently retaining said boards in angular planes whereby the top edges of said boards are closer together than the bottom edges of said boards, said resilient means comprising a spring extending between said boards adjacent each end, and a shoulder along the outside wall of each board cooperating with a separate pivot located along the inside wall of each of said side walls permitting a camming movement of said boards into substantially parallel relation when a multiple circuit connector board is pushed into said housing in the space between said boards, whereby said contact elements are forced into resilient contact with the multiple circuit connector board.

2. A multiple connector comprising an elongated rectangular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, said side walls having a plurality of staggered openings and said boards having openings aligning with said housing openings, said contact elements being mounted in said board openings whereby electrical cord connections can be passed through said side wall openings to said contacts, means for resiliently retaining said boards in angular planes whereby the top edges of said boards are closer together than the bottom edges of said boards, said resilient means comprising a spring extending between said boards adjacent each end, and a shoulder along the outside wall of each board cooperating with a separate pivot located along the inside wall of each of said side walls permitting a camming movement of said boards into substantially parallel relation when a multiple circuit connector board is pushed into said housing in the space between said boards, whereby said contact elements are forced into resilient contact with the multiple circuit connector board.

3. A multiple connector comprising an elongated rectangular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, each of said contact elements comprising an enlarged head, an integral shank extending from said head and having a tapered axial opening, and a spring surrounding said shank to retain said head in yieldable extended position from said board, means for resiliently retaining said boards in angular planes whereby the top edges of said boards are closer together than the bottom edges of said boards, said resilient means comprising a spring extending between said boards adjacent each end, and a shoulder along the outside wall of each board cooperating with a separate pivot located along the inside wall of each of said side walls permitting a camming movement of said boards into substantially parallel relation when a multiple circuit connector board is pushed into said housing in the space between said boards, whereby said contact elements are forced into resilient contact with the multiple circuit connector board.

4. A multiple connector comprising an elongated rectangular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, said side walls having a plurality of staggered openings and said boards having openings aligning with said housing openings, said contact elements being mounted in said board openings whereby electrical cord connections can be passed through said side wall openings to said contacts, each of said contact elements comprising an enlarged head, an integral shank extending from said head and having a tapered axial opening, and a spring surrounding said shank to retain said head in yieldable extended position from said board, means for resiliently retaining said boards in angular planes whereby the top edges of said boards are closer together than the bottom edges of said boards, said resilient means comprising a spring extending between said boards adjacent each end, and a shoulder along the outside wall of each board cooperating with a separate pivot located along the inside wall of each of said side walls permitting a camming movement of said boards into substantially parallel relation when a multiple circuit connector board is pushed into said housing in the space between said boards, whereby said contact elements are forced into resilient contact with the multiple circuit connector board.

5. A multiple connector comprising an elongated rectangular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, means for resiliently retaining said boards in angular planes whereby the top edges of said boards are closer together than the bottom edges of said boards, said resilient means comprising a spring extending between said boards adjacent each end, and cooperating pivot means between the outside wall of each board and the inside wall of said housing permitting a camming movement of said boards into substantially parallel relation when a multiple circuit connector board is pushed into said housing in the space between said boards, whereby said contact elements are forced into resilient contact with the multiple circuit connector board, said pivot means including a shoulder extending horizontally along the outside surface of said boards and a cooperating shoulder along the inside walls of said housing.

6. A multiple connector comprising an elongated rectangular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, said side walls having a plurality of staggered openings and said boards having openings aligning with said housing openings, said contact elements being mounted in said board openings whereby electrical cord connections can be passed through said side wall openings to said contacts, means for resiliently retaining said boards in angular planes whereby the top edges of said boards are closer together than the bottom edges of said boards, said resilient means comprising a spring extending between said boards adjacent each end, and cooperating pivot means between the outside wall of each board and the inside wall of said housing permitting a camming movement of said boards into substantially parallel relation when a multiple circuit connector board is pushed into said housing in the space between said boards, whereby said contact elements are forced into resilient contact with the multiple circuit connector board, said pivot means including a shoulder extending horizontally along the outside surface of said boards and a cooperating shoulder along the inside walls of said housing.

7. A multiple connector comprising an elongated rectangular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, each of said contact elements comprising an enlarged head, an integral shank extending from said head and having a tapered axial opening, and a spring surrounding said shank to retain said head in yieldable extended position from said board, means for resiliently retaining said boards in angular planes whereby the top edges of said boards are closer together than the bottom edges of said boards, said resilient means comprising a spring extending between said boards adjacent each end, and cooperating pivot means between the outside wall of each board and the inside wall of said housing permitting a camming movement of said boards into substantially parallel relation when a multiple circuit connector board is pushed into said housing in the space between said boards, whereby said contact elements are forced into resilient contact with the multiple circuit connector board, said pivot means including a shoulder extending horizontally along the outside surface of said boards and a cooperating shoulder along the inside walls of said housing.

8. A multiple connector comprising an elongated rectangular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, said side walls having a plurality of staggered openings and said boards having openings aligning with said housing openings, said contact elements being mounted in said board openings whereby electrical cord connections can be passed through said side wall openings to said contacts, each of said contact elements comprising an enlarged head, an integral shank extending from said head and having a tapered axial opening, and a spring surrounding said shank to retain said head in yieldable extended position from said board, means for resiliently retaining said boards in angular planes whereby the top edges of said boards are closer together than the bottom edges of said boards, said resilient means comprising a spring extending between said boards adjacent each end, and cooperating pivot means between the outside wall of each board and the inside wall of said housing permitting a camming movement of said boards into substantially parallel relation when a multiple circuit connector board is pushed into said housing in the space between said boards, whereby said contact elements are forced into resilient contact with the multiple circuit connector board, said pivot means including a shoulder extending horizontally along the outside surface of said boards and a cooperating shoulder along the inside walls of said housing.

9. A multiple connector comprising an elongated rectangular tubular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, means for resiliently retaining said boards in angular planes whereby the top edges of said boards are closer together than the bottom edges of said boards, said resilient means comprising a spring extending between said boards adjacent each end, and a shoulder along the outside wall of each board cooperating with a separate pivot located along the inside wall of each of said side walls permitting a camming movement of said boards into substantially parallel relation when a multiple circuit connector board is pushed into said housing in the space between said boards, whereby said contact elements are forced into resilient contact with the multiple circuit connector board.

10. A multiple connector comprising an elongated rectangular tubular housing having spaced parallel vertical side walls, a pair of elongated rectangular dielectric boards mounted in said housing in spaced relation, the top edge of each board being adjacent the top edge of the adjacent side wall and the bottom edge of each board being adjacent the bottom edge of the adjacent side wall, each board having a plurality of resiliently mounted contact elements extending from each board toward each other, means for resiliently retaining said boards in angular planes whereby the top edges of said boards are closer together than the bottom edges of said boards, said resilient means comprising a spring extending between said boards adjacent each end, and a shoulder along the outside wall of each board cooperating with a separate pivot located along the inside wall of each of said side walls permitting a camming movement of said boards into substantially parallel relation when a multiple circuit connector board is pushed into said housing in the space between said boards, whereby said contact elements are forced into resilient contact with the multiple circuit connector board, said housing having an open top for the insertion of cord lead connections to said contact elements, and said housing having a slotted bottom for the insertion of the multiple circuit connector board.

References Cited in the file of this patent

UNITED STATES PATENTS

| | | |
|---|---|---|
| 2,435,136 | Gardenhour | Jan. 27, 1948 |
| 2,817,824 | Albright | Dec. 24, 1957 |